United States Patent
Godfrey

(10) Patent No.: US 7,072,616 B2
(45) Date of Patent: Jul. 4, 2006

(54) MULTI-PROTOCOL INTERCHIP INTERFACE

(75) Inventor: Timothy Gordon Godfrey, Overland Park, KS (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 10/444,383

(22) Filed: May 23, 2003

(65) Prior Publication Data

US 2004/0048572 A1  Mar. 11, 2004

Related U.S. Application Data

(60) Provisional application No. 60/411,848, filed on Sep. 18, 2002, provisional application No. 60/409,356, filed on Sep. 9, 2002.

(51) Int. Cl.
*H04B 5/00* (2006.01)
(52) U.S. Cl. .................. 455/41.2; 455/41.1; 455/63.1; 455/63.3; 455/67.13; 455/114.2
(58) Field of Classification Search .............. 455/41.1, 455/41.2, 63.1, 63.3, 67.3, 114.2
See application file for complete search history.

(56) References Cited

U.S. PATENT DOCUMENTS

| | | | |
|---|---|---|---|
| 2001/0010689 A1* | 8/2001 | Awater et al. | 370/344 |
| 2002/0003792 A1 | 1/2002 | Schmidl et al. | |
| 2002/0018458 A1 | 2/2002 | Aiello et al. | |
| 2002/0051200 A1* | 5/2002 | Chang et al. | 358/1.15 |
| 2002/0055984 A1* | 5/2002 | Chang et al. | 709/217 |
| 2002/0150147 A1* | 10/2002 | Liang | 375/133 |

FOREIGN PATENT DOCUMENTS

| | | |
|---|---|---|
| WO | WO 01/80030 A1 | 10/2001 |
| WO | WO 01/84789 A2 | 11/2001 |
| WO | WO 02/11019 A1 | 2/2002 |

OTHER PUBLICATIONS

Chiasserini and Rao, "Coexistence Mechanisms for Interference Mitigation between IEEE 802.11 WLANs and Bluetooth", IEEE Infocomm 2002, pp. 590-598.

Kamerman, "Coexistence between Bluetooth and IEEE 802.11 CCK Solutions to avoid mutual interference", IEEE P802.11 Wireless LANS, pp. 1-7, Jul. 2000.

* cited by examiner

*Primary Examiner*—Lee Nguyen
*Assistant Examiner*—Minh D. Dao
(74) *Attorney, Agent, or Firm*—Thomas, Kayden, Horstemeyer & Risley

(57) ABSTRACT

An interface between radios supporting different air interfaces is disclosed that avoids some of the costs and disadvantages associated with inter-radio interfaces in the prior art. The present invention enables the needed coordination across multiple wireless protocols, such as 802.11 and Bluetooth, by providing a communication link spanning different integrated circuits when each radio is on a separate integrated circuit. This low cost, low complexity link can be added to standard integrated circuits produced by individual companies without adding appreciably to the overall cost of the integrated circuits.

9 Claims, 10 Drawing Sheets

MULTI-PROTOCOL INTERCHIP INTERFACE

CROSS-REFERENCE TO RELATED APPLICATIONS

This application claims the benefit of:
1. U.S. provisional application Ser. No. 60/409,356, filed Sep. 9, 2002, entitled "A Mechanism For Collaboration And Interference Prevention Between 802.11 And Bluetooth Using The 802.11 Power Save Mechanism,", and
2. U.S. provisional application Ser. No. 60/411,848, filed Sep. 18, 2002, entitled "Coordinating A Plurality Of Medium Access Control Protocols That Share A Common Communications Channel,", both of which are also incorporated by reference.

The following patent application is incorporated by reference:
1. U.S. patent application Ser. No. 10/444,519, entitled "Coordination of Competing Protocols,".

FIELD OF THE INVENTION

The present invention relates to telecommunications in general, and, more particularly, to a telecommunications terminal with two radios operating in accordance with two protocols that might interfere with each other.

BACKGROUND OF THE INVENTION

FIG. 1 depicts a schematic diagram of a portion of wireless communication system 100 in the prior art. Wireless communication system 100 comprises wireless terminals 101-1 through 101-6, all communicating with each other by using one or more air interfaces in the same, shared frequency band. As an example, IEEE 802.11 (i.e., "802.11") wireless terminals 101-1, 101-2, and 101-4 communicate using an 802.11 air interface, Bluetooth wireless terminals 101-5 and 101-6 communicate using a Bluetooth air interface, and 802.11/Bluetooth wireless terminal 101-3 communicates using either an 802.11 or a Bluetooth air interface.

As depicted in FIG. 1, wireless terminal 101-2 is transmitting a signal with wireless terminal 101-3 as the intended recipient. Also, wireless terminal 101-6 is transmitting a signal with wireless terminal 101-5 as the intended recipient. Wireless terminals 101-2 and 101-6 can transmit simultaneously, although in order to do so, either (1) their respective transmissions have to be coordinated, or (2) wireless terminals 101-2 and 101-6 have to be situated far enough apart from each other to minimize interference. If, however, a wireless terminal supports two air interface protocols (e.g., wireless terminal 101-3, etc.), a mechanism must exist to prevent interference (i.e., the effect of two radios transmitting simultaneously in the same frequency band), since spatial separation of two air interfaces within the same wireless terminal is not an option.

In accordance with a first technique in the prior art, FIG. 2 depicts a block diagram of the salient components of wireless terminal 101-3. Wireless terminal 101-3 comprises host 201, A/B switch 202, 802.11 radio 203, Bluetooth radio 204, antenna switch 205, and antenna 206. Host 201 comprises a microprocessor. At any given time, host 201 communicates with 802.11 radio 203 or Bluetooth radio 204, not both, by means of A/B switch 202. 802.11 radio 203 communicates in accordance with the 802.11 air interface, and Bluetooth radio 204 communicates in accordance with the Bluetooth air interface. Antenna switch 205 directs a signal to be transmitted to antenna 206 from either 802.11 radio 203 or Bluetooth radio 204. Antenna switch 205 also directs a received signal from antenna 206 to either 802.11 radio 203 or Bluetooth radio 204. Antenna switch 205 is coordinated with A/B switch 202.

The first technique in the prior art controls contention for the shared frequency band through A/B switch 202. In addition to providing contention-free access to the shared frequency band, the first technique provides a low-cost solution. As a disadvantage, however, the air interface in use must remain in either 802.11 or Bluetooth mode for relatively long periods of time. Also, contention resolution requires manual intervention on the part of a user whenever wireless terminal 101-3 has to make a transmission over the air interface that is not presently active. Finally, the inactive air interface might miss a transmission by some other wireless terminal.

In accordance with a second technique in the prior art, FIG. 3 depicts a block diagram of wireless terminal 101-3. Wireless terminal 101-3 comprises host 301, 802.11 radio 302, Bluetooth radio 303, antenna switch 304, and antenna 305. Host 301 comprises a microprocessor. At any given time, host 301 communicates with 802.11 radio 302 or Bluetooth radio 303, but not both, by means of an internal switch. Typically, the internal switch requires the user of wireless terminal 101-3 to select the air interface to be used (e.g., from a menu, etc.). Alternatively, host 301 chooses between the air interfaces based on the type of communication it needs to send or expects to receive. 802.11 radio 302 communicates in accordance with the 802.11 air interface, and Bluetooth radio 303 communicates in accordance with the Bluetooth air interface. Antenna switch 304 directs a signal to be transmitted to antenna 305 from either 802.11 radio 302 or Bluetooth radio 303. Antenna switch 304 also directs a received signal from antenna 305 to either 802.11 radio 302 or Bluetooth radio 303. Antenna switch 304 is coordinated with the selection of the air interface.

The second technique in the prior art integrates the switch into host 301, so the intervention by the user is more convenient, even though the intervention is still possibly manual. In addition to providing contention-free access to the shared frequency band, the second technique provides a more convenient way of allowing the user to change between air interfaces. As a disadvantage, however, the air interface in use must remain in either 802.11 or Bluetooth mode for relatively long periods of time. Also, contention resolution still possibly requires manual intervention on the part of a user whenever wireless terminal 101-3 has to make a transmission over the air interface that is not presently active. Finally, the inactive air interface might miss a transmission by some other wireless terminal.

In accordance with a third technique in the prior art, FIG. 4 depicts a block diagram of wireless terminal 101-3. Wireless terminal 101-3 comprises host 401, 802.11/Bluetooth radio 402, antenna switch 403, and antenna 404. Host 401 comprises a microprocessor. Host 401 maintains an interface with the 802.11 part of 802.11/Bluetooth radio 402 and an interface with the Bluetooth part of 802.11/Bluetooth radio 402. 802.11/Bluetooth radio 402 is a single integrated circuit that communicates in accordance with the 802.11 air interface and with the Bluetooth air interface. 802.11/Bluetooth radio 402 coordinates transmissions to some extent between its 802.11 part and its Bluetooth part. Antenna switch 403 directs a signal to antenna 404 to be transmitted from either the 802.11 part of 802.11/Bluetooth radio 402 or the Bluetooth part of 802.11/Bluetooth radio 402. Antenna switch 403 also directs a received signal from antenna 404 to either the 802.11 part of 802.11/Bluetooth radio 402 or the Bluetooth part of 802.11/Bluetooth radio 402.

In the prior art, approaches of integrating and dynamically coordinating multiple wireless protocols on a single platform have focused on integration into a single integrated circuit. This control necessitates coordinating the contention for the same frequency band between the two air interfaces. If the two air interface protocols are 802.11 and Bluetooth, the control must be imposed on the two air interfaces, since there is no standardized interoperability between the two air interface protocols. When the individual wireless technologies, however, are on a rapid evolutionary path, "same chip" integration can increase cost and can cause the integrated circuit development to lag behind that of separate circuits. Also, the market demand for a dual-interface solution within a single integrated circuit can be considerably smaller than the demand for either integrated circuit supporting a single protocol only (i.e., 802.11 or Bluetooth, but not both). Furthermore, even same chip integration by itself does not inherently guarantee a tight, efficient contention control between the two air interfaces.

Therefore, the need exists for multiple radios supporting different air interface protocols, possibly on separate integrated circuits, to coordinate the use of a shared frequency band.

SUMMARY OF THE INVENTION

The present invention is an interface between radios supporting different air interfaces that avoids some of the costs and disadvantages associated with inter-radio interfaces in the prior art. The present invention enables the needed coordination across multiple wireless protocols, such as 802.11 and Bluetooth, by providing a communication link spanning separate integrated circuits where each integrated circuit comprises a different radio. This low cost, low complexity link can be added to standard integrated circuits made by individual producers without adding appreciably to the overall cost of the integrated circuits.

In some embodiments of the present invention, the interface between radios is present as part of a computer that comprises a host processor in addition to the multiple radios. One variation of the computer is a wireless terminal, which is used to transmit and receive data blocks over the air. In some other embodiments, the interface between radios is present as part of a multi-radio card that plugs into a computer. In some other embodiments, the interface between radios is described as being part of a single radio.

The illustrative embodiment comprises a radio comprising: a channel-access controller for communicating in accordance with a first air interface, wherein the channel-access controller transmits a first set of signals to a collateral radio, the first set of signals comprising a first transmitting indication signal, a first receiving indication signal, and a first idle indication signal, and receives a second set of signals from the collateral radio, the second set of signals comprising a first transmit inhibit signal; and a multi-radio host interface, wherein the multi-radio host interface communicates the contents of a first data block associated with the first air interface to the channel-access controller when the first data block is received from a host interface bus, and communicates the contents of a second data block associated with the second air interface to the collateral radio when the second data block is received from the host interface bus.

DETAILED DESCRIPTION

Figure 1:
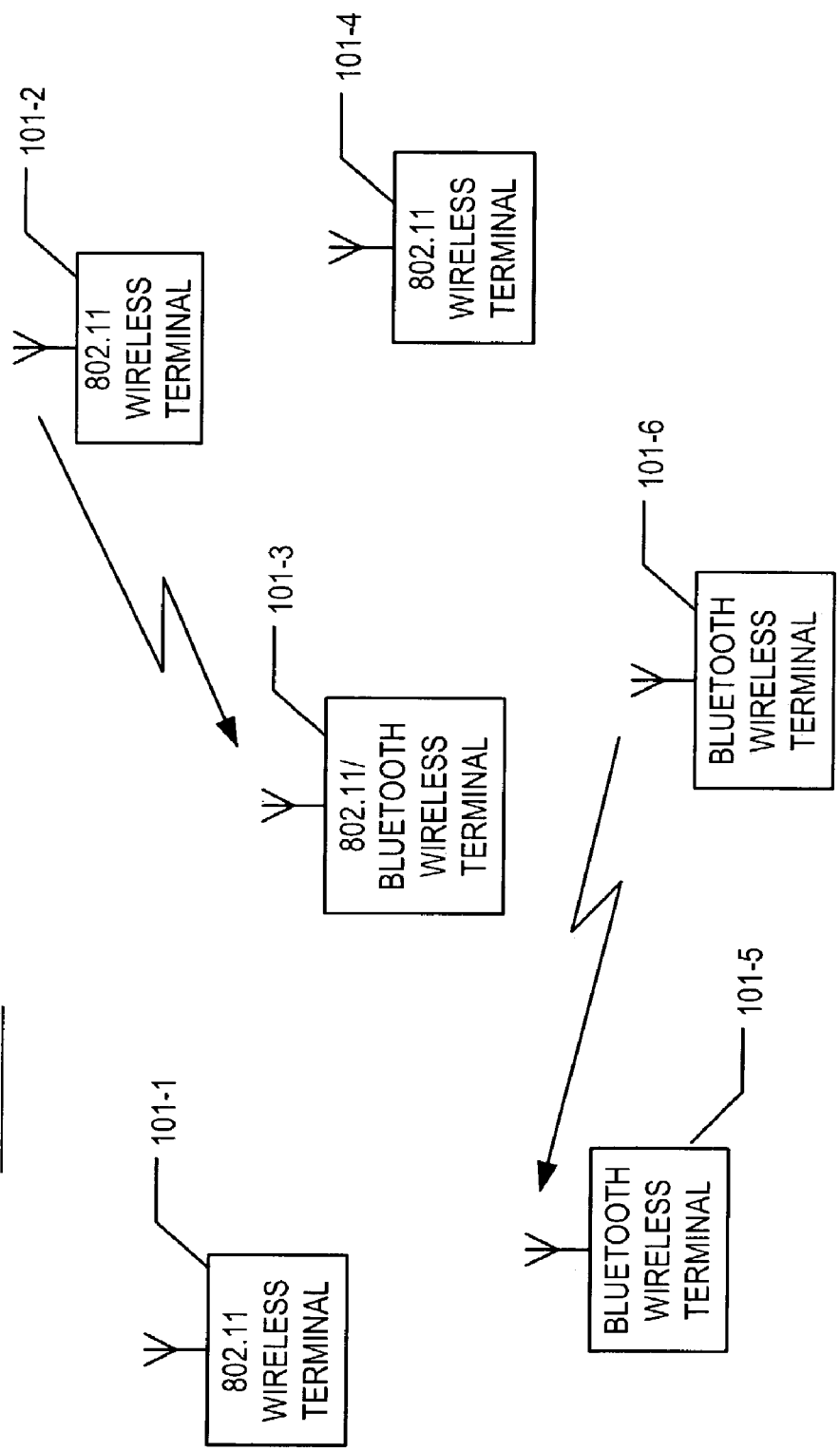
FIG. 1 depicts a schematic diagram of wireless telecommunications system 100 in the prior art.
Figure 2:
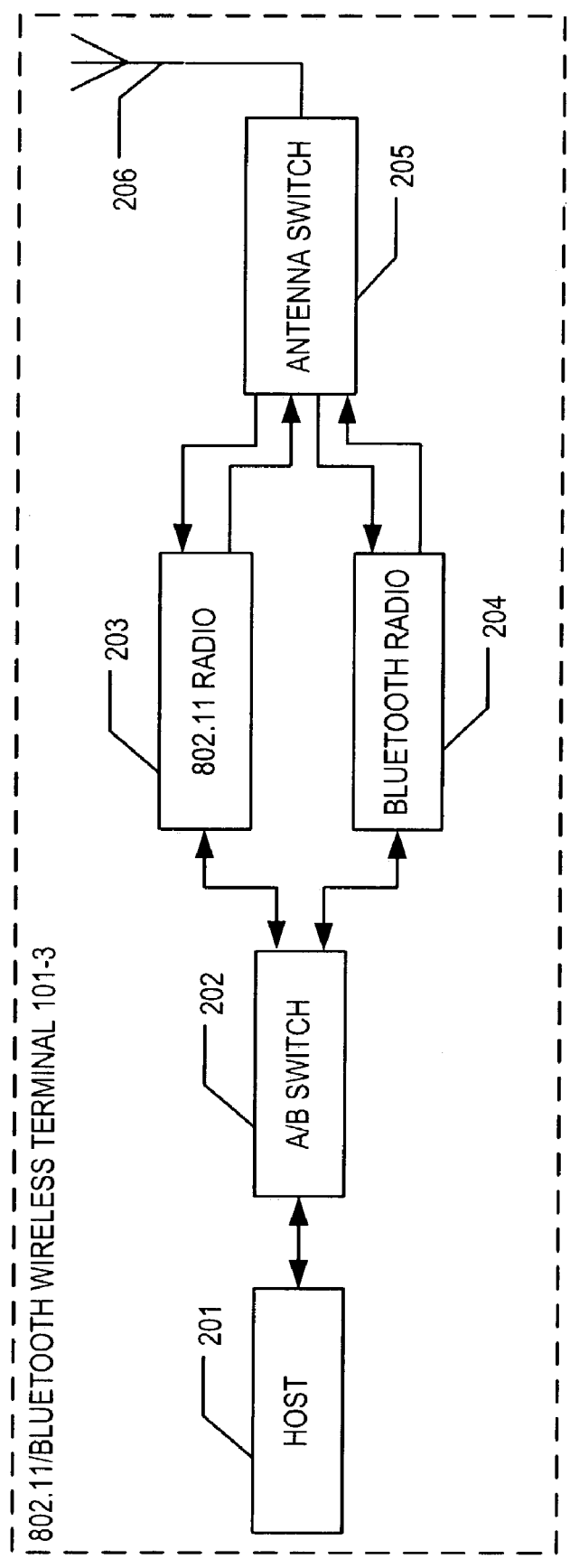
FIG. 2 depicts a block diagram of a dual protocol wireless terminal that uses a first technique in the prior art.
Figure 3:
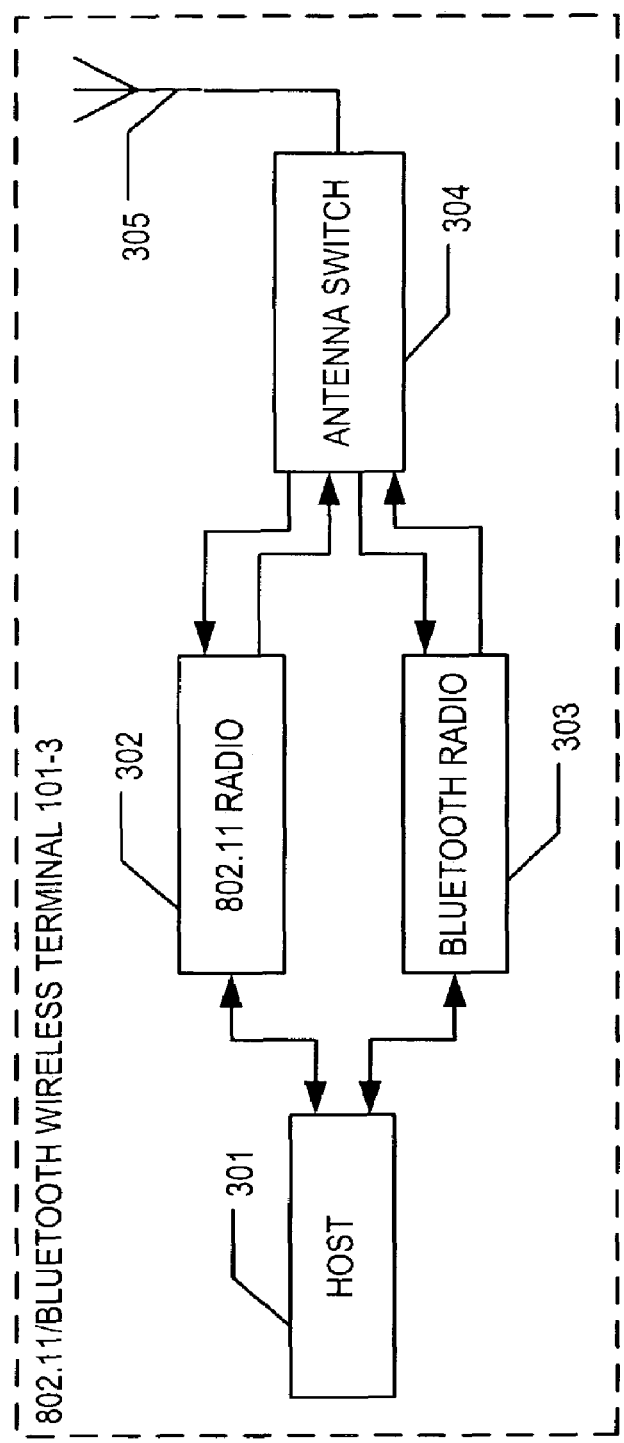
FIG. 3 depicts a block diagram of a dual protocol wireless terminal that uses a second technique in the prior art.
Figure 4:
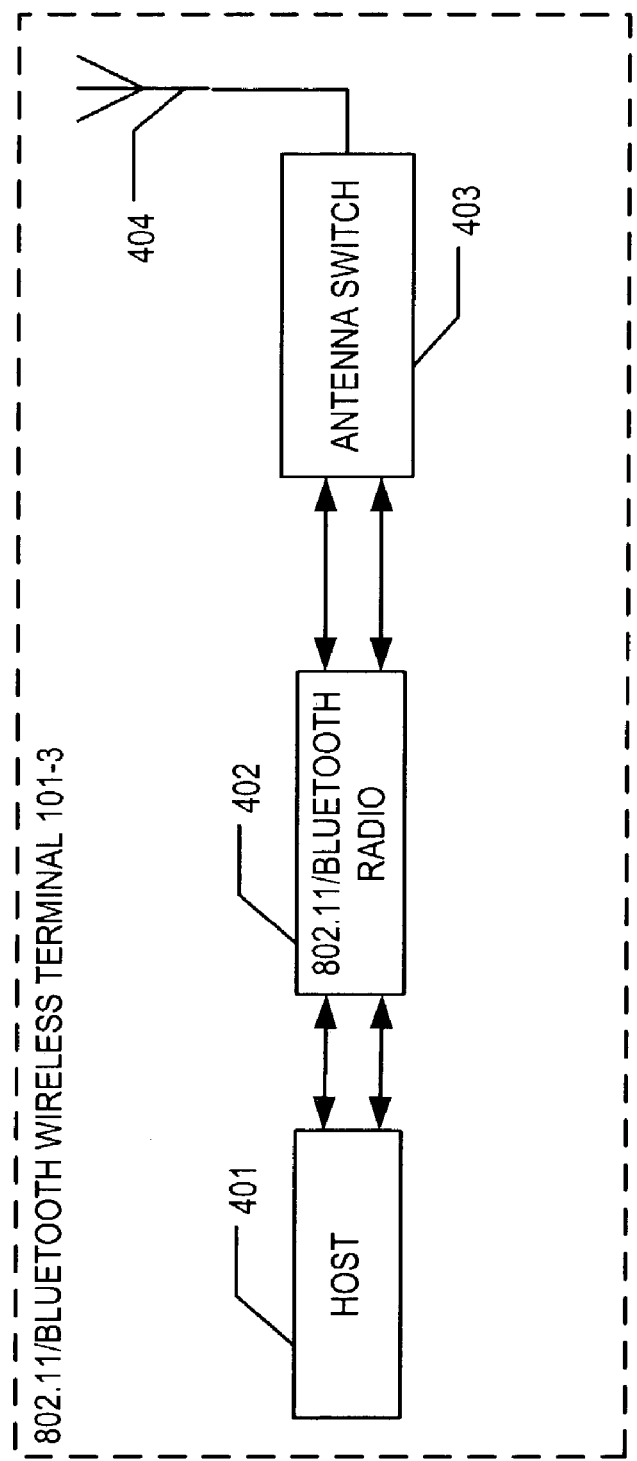
FIG. 4 depicts a block diagram of a dual protocol wireless terminal that uses a third technique in the prior art.
Figure 5:
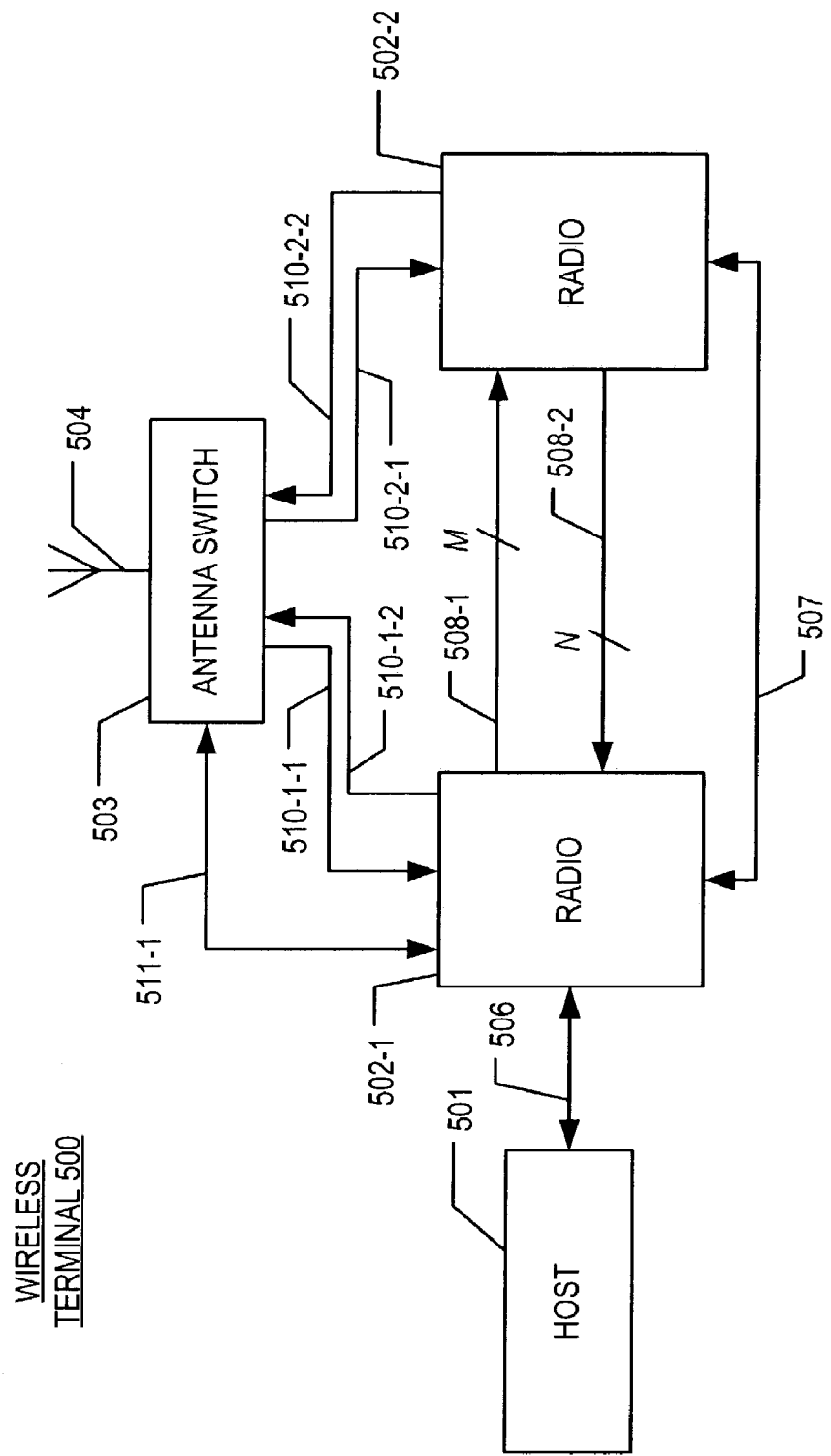
FIG. 5 depicts a block diagram of wireless terminal 500 in accordance with the first illustrative embodiment of the present invention.

FIG. 5 depicts a block diagram of wireless terminal 500 in accordance with the first illustrative embodiment of the present invention. Wireless terminal 500 is a computer that supports two distinct wireless air interface protocols concurrently for the purpose of sending and receiving data over the air on a shared frequency band. The frequency band, when used for communications purposes, is also referred to as a "communications band," comprising one or more "channels" of communication. The object referred to generically as a "data block" conveys data across a transmission medium (e.g., air, wire, etc.). A data block constitutes a message, in which the message typically comprises a header part and the data in a payload part. A data block can be also referred to as a "frame" or as a "packet." The term "frame," as is known in the art, is commonly used in an IEEE 802.11 protocol context when referring to the medium access control data blocks that are communicated over the air. The term "packet," as is known in the art, is commonly used in a Bluetooth protocol context when referring to the data blocks that are communicated over the air.

A wireless telecommunications terminal, or "wireless terminal," as described in this specification (e.g., wireless terminal 500, etc.), is a type of telecommunications terminal. The wireless protocols supported by wireless terminal 500 can be, for example, 802.11 and Bluetooth. Wireless terminal 500 comprises host 501, radio 502-1, radio 502-2, antenna switch 503, and antenna 504, interconnected as shown.

Host 501 is a computing platform (e.g., laptop, workstation, wireless terminal, etc.) comprising a general-purpose or special-purpose processor that is capable of storing data into a memory, retrieving data from a memory, and executing programs stored in a memory. The memory constituting host 501 might be random-access memory (RAM), flash memory, disk drive, etc. Host 501 processes higher-layer applications that use data that are transmitted over the air and data received over the air. Alternatively, host 501 can be the motherboard of a computer comprising a processor. Host 501 provides overall control of wireless terminal 500, and the remainder of wireless terminal 500 provides the wireless communication function of host 501. It will be clear to those skilled in the art how to make and use host 501.

Host 501 also comprises an output device and an input device. The output device (e.g., display, speaker, etc.) is a transducer that receives signals from the processor and converts the received signals to an output signal (e.g., visual, auditory, etc.) in well-known fashion. The input device receives input from a user and sends the input to the processor. As is well-known in the art, the input device can take on a variety of forms, such as a keypad, pressure-sensitive touch screen, etc.

Radio 502-1 provides the channel-access control for communicating in accordance with a first air interface (e.g., 802.11, etc.). Radio 502-1 provides this service for data blocks arriving from host 501 via host data link 506 that are to be transmitted over the air and for data blocks arriving from antenna switch 503 via path 510-1-1 that are to be sent to host 501. Radio 502-1 also receives data blocks from radio 502-2 and transmits data blocks to radio 502-2. Radio 502-1 exchanges data blocks with radio 502-2 via collateral radio data link 507, which will be described later. Radios 502-1 and 502-2 comprise a receiving function and a transmitting function and, as such, are transceivers.

Radio 502-1 receives signals from radio 502-2 and transmits signals to radio 502-2. Radio 502-1 exchanges signals with radio 502-2 via signaling link 508-1, a bus comprising M lines, and signaling link 508-2, a bus comprising N lines. Signaling links 508-1 and 508-2 will be described later.

Radio 502-1 interfaces with host 501 through host data link 506. Host data link 506 is a peripheral bus providing signaling, messaging, and control between those devices connected to the bus. It will be clear to those skilled in the art how to make and use the bus constituting host data link 506. In the illustrative embodiment, host 501 is one such device connected to the bus, and radio 502-1 is another device. Radio 502-1 can interface with the bus mechanically, as well as electrically, through a removable circuit card designed for such an application. Alternatively, radio 502-1 can be hardwired directly to host 501 via the bus constituting host data link 506. Examples of standardized busses include PCI, MiniPCI, and CardBus, all well known in the art. It will be clear to those skilled in the art how to make and use an interface that constitutes host data link 506.

Radio 502-2 provides the channel-access control for communicating in accordance with a second air interface (e.g., Bluetooth, etc.). Radio 502-2 provides this service for data blocks arriving from host 501—via host data link 506, radio 502-1, and collateral radio data link 507—to be transmitted over the air and for data blocks arriving from antenna switch 503 via path 510-2-1 to be sent to host 501. Radio 502-2 exchanges data blocks with radio 502-1 via collateral radio data link 507.

Radio 502-2 receives signals from radio 502-1 and transmits signals to radio 502-1. Radio 502-2 exchanges signals with radio 502-1 via signaling link 508-1 and signaling link 508-2. Each of radios 502-1 and 502-2 might or might not constitute its own integrated circuit.

Antenna switch 503 exchanges signals with radio 501-1 via paths 510-1-1 and 510-1-2, with radio 502-2 via paths 510-2-1 and 510-2-2, and with antenna unit 504. Antenna switch 503 enables antenna unit 504 to be shared, or switched, between radios 501-1 and 502-2, reducing the required number of antennas. Antenna unit 504 provides coupling for transmitted and received signals between antenna switch 503 and the air. Antenna unit 504 can consist of a single antenna or it can consist of multiple antennas (e.g., one antenna for transmit, two antennas for receive, etc.). Antenna unit 504 can support receive diversity, transmit diversity, or both. Radio 501-1, radio 502-2, or host 501 can control the antenna switching. FIG. 5 depicts radio 501-1 providing control of antenna switching via path 511-1. It will be clear to those skilled in the art how to make and use antenna switch 503 and antenna unit 504. It will also be clear to those skilled in the art how to make and use a wireless terminal (e.g., wireless terminal 500, etc.) without antenna switch 503.

Collateral radio data link 507 provides a path through which radio 502-2 exchanges data blocks with host 501. Essentially, collateral radio data link 507 provides the host interface for radio 502-2. This "daisy-chaining" of host 501, radio 502-1, and radio 502-2 is necessary, since multiple integrated circuits with host interfaces that use certain bus standards, such as PCI, cannot be located on the same card because of the loading requirements of the bus. PCI, however, supports a multiple function model, in which more than one logical host interface is combined into a single physical integrated circuit. Radio 502-1 uses the ability to host more than one logical host interface and uses collateral radio data link 507 to provide radio 502-2 with access to host 501. It will be clear to those skilled in the art how to host more than one logical host interface for a given physical interface.

Figure 6:
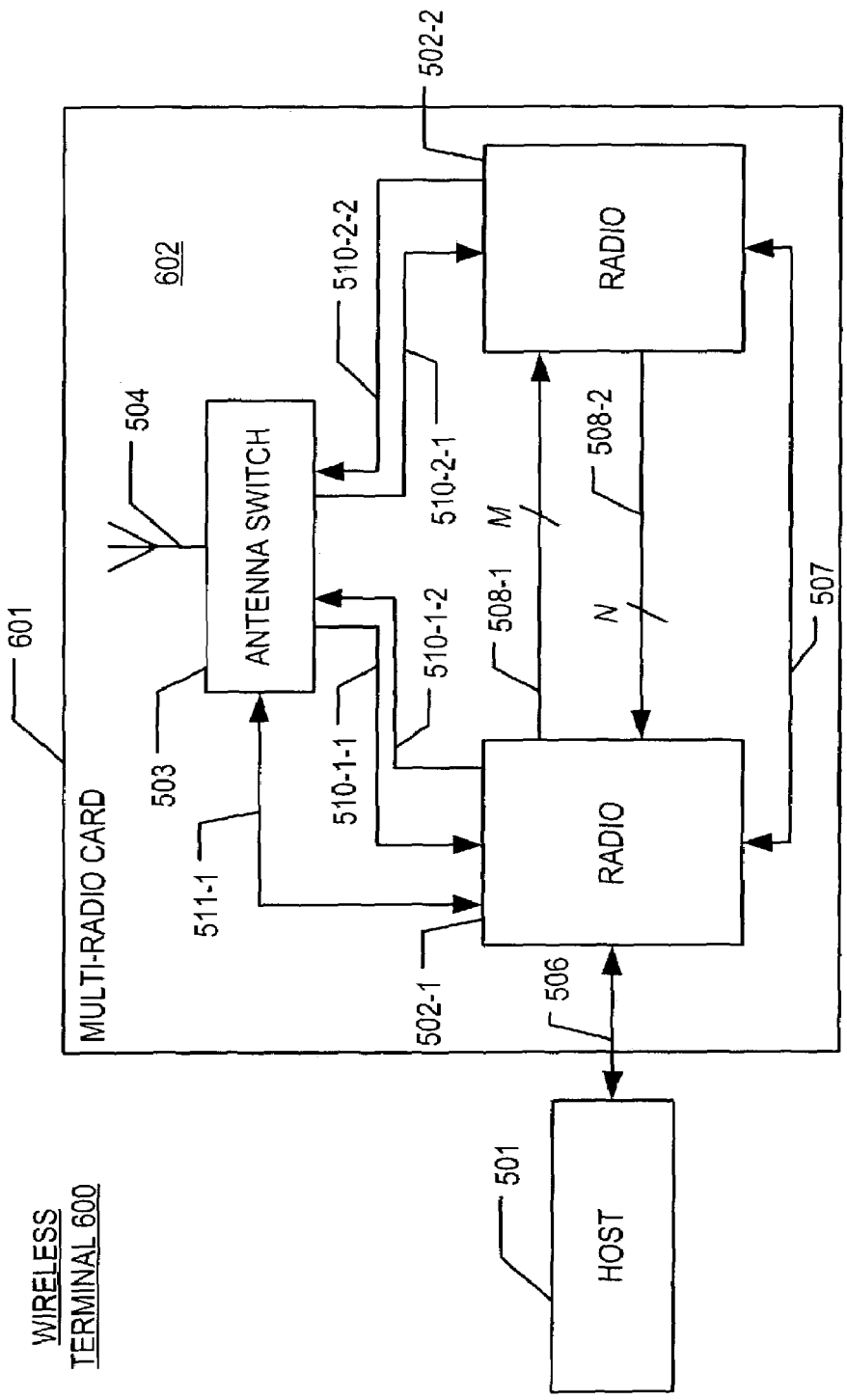
FIG. 6 depicts a block diagram of multi-radio card 600 in accordance with the second illustrative embodiment of the present invention.

FIG. 6 depicts a block diagram of wireless terminal 600 in accordance with the Second illustrative embodiment of the present invention. Wireless terminal 600 supports two distinct wireless air interface protocols concurrently. The wireless protocols supported by wireless terminal 600 can be, for example, 802.11 and Bluetooth. Wireless terminal 600 comprises host 501, radio 502-1, radio 502-2, antenna switch 503, and antenna unit 504, interconnected as shown.

Radio 502-1, radio 502-2, antenna switch 503, antenna unit 504, and printed circuit board 602 constitute multi-radio card 601. Each of radios 502-1 and 502-2 might or might not constitute its own integrated circuit. Multi-radio card 601 is mechanically separable from host 501 and is electrically connected to host 501 using a card bus standard, in well-known fashion. The set of possible standards comprises PCI, MiniPCI, and CardBus. Printed circuit board 602, constituting multi-radio card 601, plugs into a card bus interface that electrically connects host 501 and radio 502-1, and can be physically removed from that interface as needed. It will be clear to those skilled in the art how to make and use printed circuit board 602 as part of multi-radio card 601.

The relationship and interaction between the elements depicted in FIG. 6 differ from that in FIG. 5 only in that the elements constituting multi-radio card 601 are mechanically separable from (i.e., not hardwired to) host 501. Elements common to both FIGS. 5 and 6 have been described above.

Figure 7:
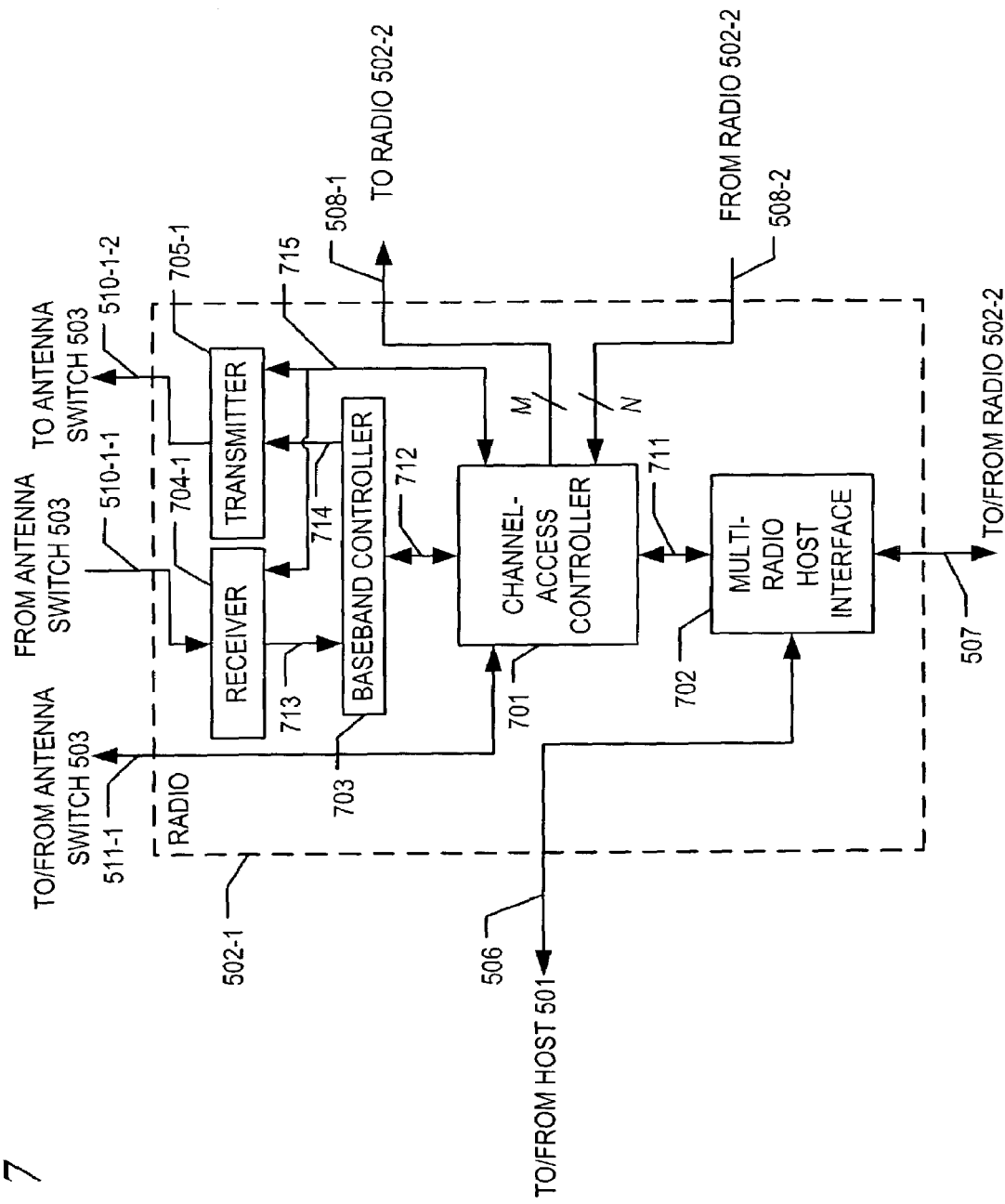
FIG. 7 depicts a diagram of the salient components of radio 502-1 in accordance with the third illustrative embodiment of the present invention.

FIG. 7 depicts a block diagram of radio 502-1 in accordance with the third illustrative embodiment of the present invention. As is well known in the art, radio 502-1 might or might not constitute its own integrated circuit. Channel-access controller 701 provides the medium access control (MAC) functionality for communicating in accordance with a first air interface (e.g., 802.11, etc.). Note that the term "medium access control," as used in this specification, denotes the functionality that determines which wireless terminal transmits next on a multi-access (shared) channel, constituting a communications band, for a given air interface. Channel-access controller 701 accepts host data from multi-radio host interface 702 via path 711. It provides data from host 501 to baseband controller 703 via path 712 for preparation for transmission. Channel-access controller 701 also provides data received over the air from baseband controller 703 via path 712 to host 501 through path 711 and multi-radio host interface 702. Channel-access controller 701 can track whether it has control or radio 502-2 has control of the frequency band at any given moment. Consequently, channel-access controller 701 can control antenna switching at antenna switch 503 via path 511-1. Alternatively, channel-access controller 701 can operate uninformed of the status of radio 502-2.

Channel access controller 701 can pass to radio 502-2 via signaling link 508-1 information representative of receiver 704-1 and transmitter 705-1, received through path 715. Channel access controller 701 can pass to receiver 704-1 and transmitter 705-1 via path 715 information representative of radio 502-2, received through signaling link 508-2. It will be clear to those skilled in the art how to make and use channel-access controller 701.

In accordance with the illustrative embodiment of the present invention, multi-radio host interface 702 provides the interface between host 501 and radio 502-1. Multi-radio host interface 702 accepts data blocks from host 501 via host data link 506. Multi-radio interface 702 then determines whether it should (1) transfer each data block to channel-access controller 701 via path 711, if the data block is meant for radio 502-1, or (2) relay the data block over to radio 502-22 via collateral radio data link 507. Multi-radio host interface 702 accepts data blocks from channel-access controller 701 and transfers them to host 501. In other words, multi-radio host interface 702 provides multiple logical channel interfaces on a single physical channel interface to host 501. After reading this specification, it will be clear to those skilled in the art how to make and use multi-radio host interface 702.

Baseband controller 703 exchanges signals with channel-access control 701 via path 712. It also exchanges signals with receiver 704-1 and transmitter 705-1 via paths 713 and 714, respectively. In the receive direction, baseband controller 703 accepts the demodulated signal from receiver 704-1 and converts the signal into a format that can be used by channel-access controller 701. In the transmit direction, baseband controller 703 takes the signal from channel-access controller 701 and converts the signal into a format that is ready for modulation to the transmit frequency, the modulation being performed by transmitter 705-1. It will be clear to those skilled in the art how to make and use baseband controller 703.

In addition to exchanging signals with baseband controller 703, receiver 7041 and transmitter 705-1 exchange signals with antenna switch 503 via paths 510-1-1 and 510-1-2, respectively. Transmitter 705-1 provides part of the functionality of the physical layer of communication—that is, modulation of the baseband signals, representing data blocks, received from baseband controller 703 to characteristics consistent with the particular air interface protocol supported by radio 502-1. Transmitter 705-1 can accomplish modulation through an intermediate frequency (IF) section, or stage, and a radio frequency section. It then amplifies the signal to be transmitted via a power amplifier section. Transmitter 705-1 transmits the modulated and amplified signal over the air through antenna switch 503 and antenna unit 504. Receiver 704-1 receives, amplifies, and demodulates signals from antenna switch 503 and antenna unit 504, providing the signals to baseband controller 703. Respectively, receiver 704-1 and transmitter 705-1 receives and transmits signals at a radio frequency communications band, such as, for example, the 2.4 GHz Industrial, Scientific, and Medical (ISM) band or the 5.0 GHz ISM band. It will be clear to those skilled in the art how to make and use receiver 704-1 and transmitter 705-1.

Radio 502-1 communicates with radio 502-2 via collateral radio data link 507, signaling link 508-1, and signaling link 508-2. Collateral radio data link 507 serves to exchange data blocks between host 501 and radio 502-2, in well-known fashion. In accordance with the illustrative embodiment of the present invention, signaling link 508-1 and signaling link 508-2 provide the signaling interface between radio 502-1 and radio 502-2, conveying transmitting/receiving status and specifying control. Signaling link 508-1 provides inter-MAC messaging from radio 502-1 to radio 502-2. Similarly, signaling link 508-2 provides inter-MAC messaging from radio 502-2 to radio 502-1.

Signaling links 508-1 and 508-2 comprise a communication and coordination protocol. Signaling links 508-1 and 508-2 also provide time synchronization functions between radio 502-1 and 502-2 for the purposes of determining time intervals corresponding to transmit opportunities for either air interface (i.e., the air interface served by radio 502-1 and the air interface served by radio 502-2). These characteristics are described below.

Signaling link 508-1 conveys a first set of signals from radio 502-1 to radio 502-2. In some embodiments, this first set of signals comprises a first transmitting indication signal, a first receiving indication signal, and a first idle indication signal. The transmit indication signal indicates when radio 502-1 is transmitting signals over the air. The receive indication signal indicates when radio 502-1 is receiving (or attempting to receive) signals from over the air. The idle indication signal indicates when radio 502-1 is neither in transmit mode nor in receive mode (but is still powered on). The idle indication signal, for example, can be used to indicate when radio 502-1 is in a power save mode; possibly an opportunity in time when radio 502-2 can control the shared frequency band. It will be clear to those skilled in the art how to determine which signal levels indicate what condition.

Signaling link 508-2 transfers a second set of signals from radio 502-2 to radio 502-1. In some embodiments, this second set of signals comprises a first transmit inhibit signal. The transmit inhibit signal specifies that radio 502-2 is commanding radio 502-1 to inhibit transmitter 705-1 of radio 502-1. In an illustrative scenario, radio 502-2 has time-critical information to transmit over the air and needs to "cut in" to radio 502-1's usage of the communications band. Use of the transmit inhibit signal in this scenario forces the radio frequency and intermediate frequency sections of transmitter 705-1 (within radio 502-1) out of transmit mode or turns off the power amplifier section or both, whatever ensures that no signal is transmitted by transmitter 705-1. It will be clear to those skilled in the art how to turn off the transmitter 705-1 of radio 502-1 so that no signal is radiated over the air. It will be clear to those skilled in the art how to determine which signal levels indicate which conditions.

In some other embodiments, radio 502-2 also uses signaling link 508-2 to send a polite request signal to radio 502-1 as part of the second set of signals. The polite request signal indicates to radio 502-1 that radio 502-2 has a data block to transmit, but does not necessarily have to send it at that moment. Correspondingly, radio 502-1 understands that it does not have to turn off its transmitter the moment it receives a polite request signal. The polite request signal can also be used to indicate level of urgency or importance of the data block requiring transmission, the time by which the data block has to be transmitted (i.e., latency tolerance), or other time-sensitive characteristics of the data blocks. The particular usage of the polite request signal depends on the relationship of the respective air interfaces of radios 502-1 and 502-2. It will be clear to those skilled in the art how to customize the usage of the polite request signal. It will be clear to those skilled in the art how to determine which signal levels indicate which conditions.

Radio 502-1 continually monitors the second set of signals sent on signaling link 508-2. Radio 502-1 uses the signals to make decisions as to when to transmit, when not to transmit, and when to communicate status or control or both back to radio 502-2 along signaling link 508-1.

In some embodiments, all signals sent across signaling links 508-1 and 508-2 apply bi-directionally—that is, each signal described thus far can also be sent in the direction opposite to what has been described. Signaling link 508-1 can also send, as the first set of signals, a second transmit inhibit signal and a polite request signal. Furthermore, signaling link 508-2 can also send, as the second set of signals, a second transmitting indication signal, a second receiving indication signal, and a second idle indication signal. This fully reciprocal sharing between radios 501-1 and 501-2 of status and control signals can be used, for example, in applications where master control of the radios—functionality essentially residing in radio 502-1 in the illustrative embodiments has to be reassigned to a different radio (e.g., radio 502-2, etc.).

Figure 8:
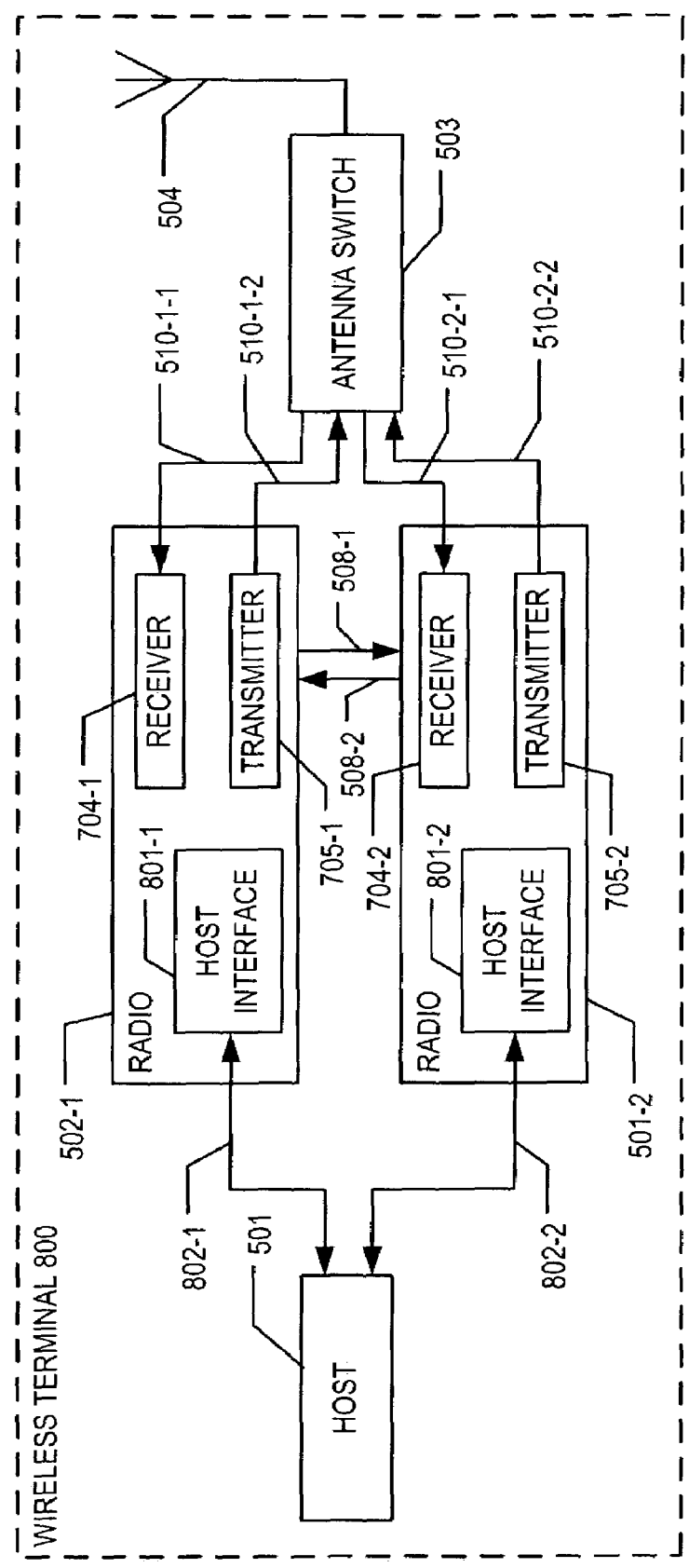
FIG. 8 depicts a block diagram of wireless terminal 800 in accordance with the fourth illustrative embodiment of the present invention.

FIG. 8 depicts a block diagram of wireless terminal 800 in accordance with the fourth illustrative embodiment of the present invention. Wireless terminal 800 supports two distinct wireless air interface protocols concurrently. The wireless protocols supported by wireless terminal 800 can be, for example, 802.11 and Bluetooth. Wireless terminal 800 comprises host 501, radio 502-1, radio 502-2, antenna switch 503, and antenna unit 504, interconnected as shown. Radio 502-1 comprises receiver 704-1, transmitter 705-1, and host interface 801-1. Radio 502-2 comprises receiver 704-2, transmitter 705-2, and host interface 801-2. Other elements constituting radios 502-1 and 502-2 have been depicted earlier and for clarity are not depicted in FIG. 8.

Each of host data links 802-1 and 802-2 is a peripheral bus providing signaling, messaging, and control between those devices connected to the bus. It will be clear to those skilled in the art how to make and use the bus constituting each of host data links 802-1 and 802-2. In the illustrative embodiment, host 501 is one such device connected to the bus, radio 502-1 is another device regarding host data link 802-1, and radio 502-2 is yet another device regarding host data link 802-2. Each of radios 502-1 and 502-2 can interface with its bus mechanically, as well as electrically, through a removable circuit card designed for such an application. Examples of standardized busses include PCI, MiniPCI, and CardBus, all well known in the art. It will be clear to those skilled in the art how to make and use an interface that constitutes host data link 802-1 and an interface that constitutes host data link 802-2.

Host interface 801-1 provides the interface between host 501 and radio 5021, in well-known fashion. Host interface 801-1 accepts data blocks from host 501 via host data link 802-1. Host interface 801-1 is also connected to channel-access controller 701 (described earlier) in radio 705-1 via a path equivalent to path 711 and accepts data blocks from channel-access controller 701, transferring them to host 501. Note that host interface 801-1 is identical to multi-radio host interface 702, except that host interface 801-1 does not have to sort out data blocks for or from radio 502-2. It will be clear to those skilled in the art how to make and use host interface 801-1.

Host interface 801-2 provides the interface between host 501 and radio 5022, in well-known fashion. Host interface 801-2 accepts data blocks from host 501 via host data link 802-2. Host interface 801-2 is also connected to channel-access controller 701 (described earlier) in radio 705-2 via a path equivalent to path 711 and accepts data blocks from channel-access controller 701, transferring them to host 501. It will be clear to those skilled in the art how to make and use host interface 801-2.

Figure 9:
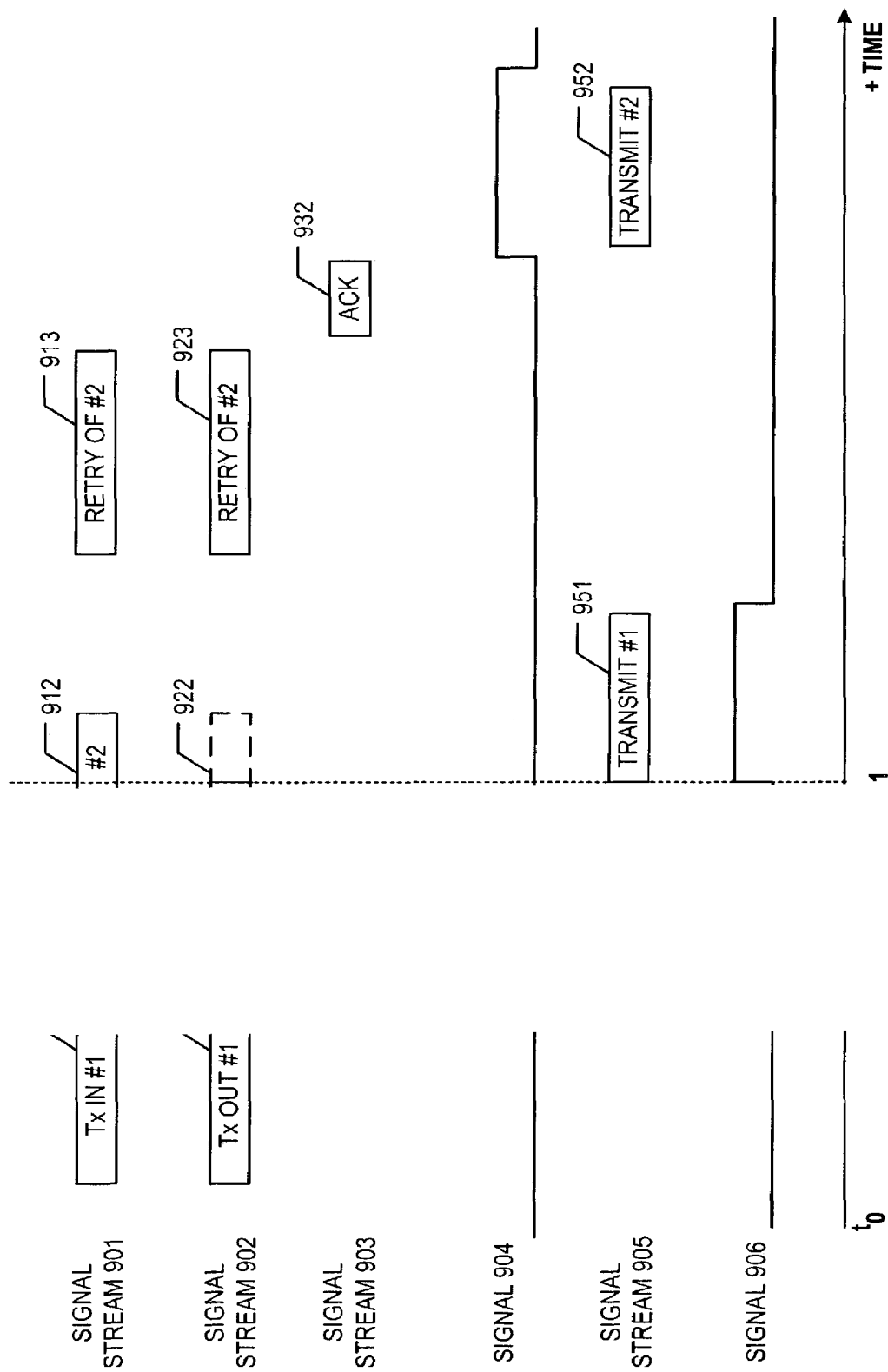
FIG. 9 depicts a graph of signals transmitted and their interrelationship in the illustrative embodiment of the present invention.

FIG. 9 depicts a timing diagram of an exemplary communication sequence for receiver 704-1, transmitter 705-1, and transmitter 705-2, in accordance with the illustrative embodiment of the present invention. This timing diagram serves to illustrate the operation of radio 502-1 and radio 502-2 in accordance with the fifth illustrative embodiment of the present invention. For illustrative purposes, radio 502-1 operates in accordance with the 802.11 air interface protocol and radio 502-2 operates in accordance with the Bluetooth air interface protocol. It will be clear, however, to those skilled in the art that radios 502-1 and 502-2 can operate in accordance with other protocols.

FIG. 9 shows two sequences related to transmitter 705-1. Signal stream 901 represents the input signal into transmitter 705-1 provided on path 714, and signal stream 902 represents what actually is transmitted by transmitter 705-1 (i.e., the transmitter's "output" on path 510-1-2). The distinction between transmitter 705-1's input and its output will be made clear below.

The first frame intended for transmission is frame 911, provided to transmitter 705-1. Since transmitter 705-1 is active, transmitted frame 921 (corresponding to frame 911) is equivalent to frame 911 (i.e., all of frame 911 reaches antenna unit 504), except for the fact that frame 911 is an unmodulated signal while frame 921 is modulated.

The next transmission in the sequence is acknowledgement frame 931 of signal stream 903, which is received, in well-known fashion, by receiver 704-1 from the station to which frame 921 was directed.

The next frame intended for transmission in the sequence is frame 912, provided to transmitter 705-1. As shown in FIG. 9, at time to during transmission of corresponding frame 922, transmitter 705-2 transmits, as part of signal stream 905, lower latency-tolerant packet 951 (e.g., a synchronous connection-oriented [SCO] packet, etc.), while simultaneously, the transmit inhibit signal (described earlier), represented by signal 906, is set high. The transmit inhibit signal is provided on signaling link 508-2.

For the purposes of discussion of the illustrative embodiments of the present invention, it is assumed that setting a signal high indicates that control is being exercised and that resetting a signal low indicates that control is no longer being exercised by the particular signal line. It will be clear to those skilled in the art how to indicate control in a way that is suitable to the particular design.

The transmit inhibit signal indicated to radio 502-1 and, more particularly, to transmitter 705-1, ultimately controls the signal radiated by radio 502-1. In order to suppress radiation of a signal, it might be necessary to turn off or turn low the power amplifier and the RF/IF sections of transmitter 705-1, as described earlier. It will be clear to those skilled in the art how to suppress output from transmitter 705-1.

Setting the transmit inhibit signal prevents the remainder of frame 912 from reaching antenna unit 504, as shown by frame 922. When transmitter 705-2 completes lower latency-tolerant packet 951, the transmit inhibit signal resets low, thereby allowing input to transmitter 705-1 to once again reach antenna unit 504. The transmit inhibit signal, in combination with any intermediate logic gates required to format the control signal actually provided to transmitter 705-1, acts as a preemption signal that effectively suppresses output from transmitter 705-1 during transmitter 705-2's transmissions, thereby avoiding interference.

Meanwhile, transmitter 705-1, unaware that frame 912 did not fully reach antenna unit 504, waits for an acknowledgement in accordance with automatic repeat request (ARQ) error correction, as is well understood in the art. Since frame 912 was effectively interrupted, transmitter 705-1 does not receive such an acknowledgement, and, after a timeout in accordance with the protocol, retries frame 912 (in the form of frame 913.) As illustrated in FIG. 9, as long as Bluetooth packet 951 is kept sufficiently short, transmitter 705-1 is no longer suppressed by transmitter 705-2 when transmitting frame 913. Consequently, frame 913 in its entirety reaches antenna unit 504 (shown by frame 923), and receiver 704-1 subsequently receives acknowledgement 932. Recalling the 802.11/Bluetooth nature of the example depicted by FIG. 9, the IEEE 802.11 ARQ error correction thus automatically compensates for sufficiently-short Bluetooth interruptions (i.e., interruptions that are not "fatal") without any changes to the protocols.

It will be clear to those skilled in the art that ARQ error correction will also automatically compensate for sufficiently-short transmissions from transmitter 705-2 of radio 502-2 that overlap receiver 704-1's receiving of data. In addition, it will be clear to those skilled in the art how to make and use alternative embodiments of the present invention for protocols that use other methods of error correction (e.g., forward error correction, etc.) In the case of forward error correction, for example, the interruption of a transmission is not fatal as long as the interruption is kept short enough so that the number of suppressed bits is below the particular error correction threshold.

So far throughout the exemplary sequence depicted in FIG. 9, radio 502-1 has been active, as shown by the "low" value of signal 904, corresponding to the first idle indication signal of radio 502-1, which is provided by signaling link 508-1 to radio 502-2. After acknowledgement frame 932, radio 502-1 enters power-save (i.e., idle) mode, as shown in FIG. 9 by the transition of first idle indication signal (signal 904) from low to high. Transmitter 705-2, upon detecting this transition, takes advantage of this situation by transmitting higher latency-tolerant packet 952 (e.g., an asynchronous connection-less [ACL] packet, etc.). Thus, instead of preempting transmitter 705-1, as is done for transmissions with a lower latency tolerance (e.g., transmission 951, etc.), transmitter 705-2 waits for radio 502-1 to enter power-save mode before initiating transmissions with a higher latency tolerance (e.g., 952, etc.).

When radio 502-1 exits power-save mode (i.e., "wakes up"), it executes a "warm-up sequence" before transmitting any frames, as is well known in the art. If radio 502-1 happens to wake up while transmitter 705-2 is still transmitting, radio 502-2, which detects that radio 502-1 has awakened, terminates transmitter 705-2's transmissions. As will be clear to those skilled in the art, the warm-up sequence of radio 502-1, operating in the example in accordance with the Bluetooth protocol, gives transmitter 705-2 plenty of time to gracefully terminate any in-progress transmissions. Any "left-over" information that transmitter 705-2 was unable to transmit before radio 502-1 awoke is queued for the next time that radio 502-1 enters power-save mode; this postponement is not problematic since, by definition, the information has a higher latency tolerance. If, instead, this information had a lower latency tolerance, transmitter 705-2 would have previously preempted transmitter 705-1, as described above.

Figure 10:
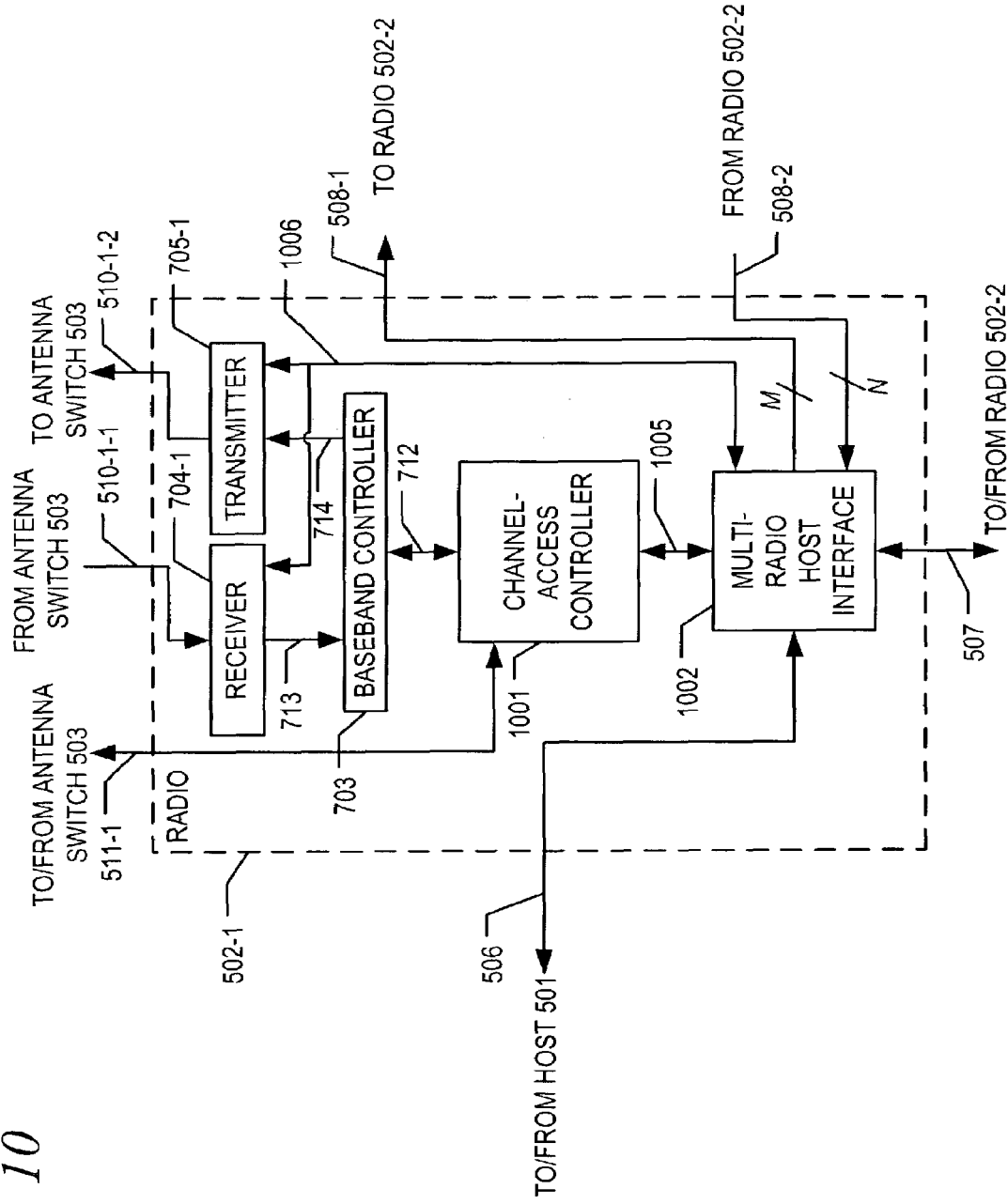
FIG. 10 depicts a diagram of the salient components of radio 502-1 in accordance with another variation of the third illustrative embodiment of the present invention.

FIG. 10 depicts a block diagram of radio 502-1 in another variation of the third illustrative embodiment of the present invention. FIG. 10 is similar to FIG. 7, except that the signaling links between radios 502-1 and 502-2 are interfaced directly to multi-radio host interface 1002. Consequently, channel-access controller 1001, multi-radio host interface 1002, and path 1005 are different from channel-access controller 701, multi-radio host interface 702, and path 705, respectively.

Channel-access controller 1001 provides the medium access control functionality for communicating-in accordance with a first air interface (e.g., 802.11, Bluetooth, etc.). In this regard, it provides the same functionality as channel-access controller 701. It accepts host data from multi-radio host interface 1002 via path 1005. It provides data from host 501 to baseband controller 703 via path 712 for preparation for transmission. Channel-access controller 1001 also provides data received over the air from baseband controller 703 via path 712 to host 501 through path 1005 and multi-radio host interface 1002. Channel-access controller 1001 can track whether it has control or radio 502-2 has control of the communications band at any given moment. Consequently, channel-access controller 1001 can control antenna switching at antenna switch 503 via path 511-1. Alternatively, channel-access controller 1001 can operate uninformed of the status of radio 502-2.

Channel access controller 1001 can pass to radio 502-2 via signaling link 5081 information representative of receiver 704-1 and transmitter 705-1, received through path 1006. Channel access controller 1001 can pass to receiver 704-1 and transmitter 705-1 via path 1006 information representative of radio 502-2, received through signaling link 508-2. It will be clear to those skilled in the art how to make and use channel-access controller 1001.

In accordance with the illustrative embodiment of the present invention, multi-radio host interface 1002 provides the interface between host 501 and radio 502-1. Multi-radio host interface 1002 accepts data blocks from host 501 via host data link 506. Multi-radio host interface 1002 then determines whether it should (1) transfer each data block to channel-access controller 1001 via path 1005, if the data block is meant for radio 502-1, or (2) relay the data block over to radio 502-2 via link collateral radio data link 507. Multi-radio host interface 1002 accepts data blocks from channel-access controller 1001 and transfers them to host 501. In other words, multi-radio host interface 1002 provides multiple logical channel interfaces on a single physical channel interface to host 501. After reading this specification, it will be clear to those skilled in the art how to make and use multi-radio host interface 1002.

Multi-radio host interface 1002 terminates one end of collateral radio data link 507, as well as signaling links 508-1 and 508-2. Collateral radio data link 507 and signaling links 508-1 and 508-2 can be different interfaces to radio 502-2 physically, or they can be the same interface. It will be clear to those skilled in the art how to combine collateral radio data link 507 and signaling links 508-1 and 508-2 into one interface. Each of the interfaces with radio 502-2 can be a serial interface or a parallel interface. It will be clear to those skilled in the art how to make and use a serial or parallel interface. If one or more of collateral radio data link 507 and signaling links 508-1 and 508-2 are serial, the serial interface characteristics can comprise SERDES, IEEE1394 style data/strobe encoding, or RFF(2,5) coding, in well-known fashion.

The signaling information that is exchanged between radio 502-1 and 502-2 can be represented in any of a variety of formats. Signals from radio 502-1 can be communicated to radio 502-2 along signaling link 508-1 via a single high or low electrical signal, one signal value per state, in well-known fashion. For example, when radio 502-1 wants to indicate that it is transmitting, it can set the transmitting indication signal line to "high" and maintain that signal value for as long as radio 502-1 is in the transmitting state. When radio 502-1 stops transmitting, it can reset the transmitting indication signal line to "low", and maintain that signal value for as long as radio 502-1 is not transmitting. Similarly, signals from radio 502-2 can be communicated to radio 502-1 along signaling link 508-2 via a single high or low electrical signal, one signal value per state, in well-known fashion.

Alternatively, signals can be communicated between radio 502-1 and radio 502-2 via a packet format (i.e., a format using blocks of data to represent information), as opposed to using individual electrical signal levels to directly represent information. For example, when radio 502-1 wants to indicate that it is transmitting, it can prepare and transfer a packet message to radio 502-2 indicating "transmitting" when the state change from "not transmitting" to "transmitting" occurs. When radio 502-1 stops transmitting, it can prepare and transfer a packet message to radio 502-2 indicating "not transmitting" when the state change from "transmitting" to "not transmitting" occurs. The packet message also specifies the type of message being sent, such as control (e.g., transmit inhibit, etc.), status (e.g., idle indication, etc.), or host interface-related (e.g., data message for radio 502-2 from host 501, etc.). The packet format can be transferred in full-duplex, bi-directional fashion between radios 502-1 and 502-2. It will be clear to those skilled in the art how to make and use a packet format to convey signals and to do so in full-duplex, bi-directional fashion.

FIG. 10 depicts signaling link 508-1 as comprising M lines and signaling link 508-2 as comprising N lines. This is for illustrative purposes only, since signaling links 508-1 and 508-2 can be combined with collateral radio data link 508 in practice. The values for M and N depend on several factors, including (in no particular order):

1. Whether each of signaling link 508-1 and 508-2 is a serial or parallel interface;
2. How wide the parallel interface is;
3. If communication is full-duplex, bidirectional;
4. If the information is sent in packet format; and
5. If collateral radio data link 507, signaling link 508-1, and signaling link 508-2 are combined into one interface.

Values for M and N are determined in well-known fashion. If the three links are combined into one serial interface that is full-duplex, bi-directional with packet format, the number of lines required by that interface is as little as two, consistent with the notion of low cost, low complexity.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A radio comprising:
   a channel-access controller for
      transmitting a first idle indication signal to a collateral radio and for receiving a first transmit inhibit signal from said collateral radio; and
   a host interface for receiving a first data block from a host interface bus, for providing said first data block to said channel-access controller, for receiving a second data block from said host interface bus, and for providing said second data block to said collateral radio.

2. The radio of claim 1 wherein said channel-access controller is also for receiving a first polite request signal from said collateral radio.

3. The radio of claim 1
   wherein said channel-access controller is also for transmitting a first transmitting indication signal to said collateral radio.

4. The radio of claim 1 wherein said radio operates in accordance with 802.11 and said collateral radio operates in accordance with Bluetooth.

5. The radio of claim 1 wherein said host interface bus is a serial interface.

6. The radio of claim 1, wherein said radio is an integrated circuit.

7. A multi-radio card comprising:
   (a) a first radio for communicating in accordance with a first air interface wherein said first radio comprises:
      (1) a first channel-access controller
         for transmitting a first idle indication signal to a second radio and for receiving a first transmit inhibit signal and said second radio, and
      (2) a host interface for receiving a first data block from a host interface bus, for providing said first data block to said channel-access controller, for receiving a second data block from said host interface bus, and for providing said second data block to said second radio; and
   (b) said second radio for communicating in accordance with said second air interface, for receiving said first idle indication signal from said first radio and for transmitting said transmit inhibit signal to said first radio.

8. The multi-radio card of claim 7 further comprising an antenna switch for switching between a transmission signal corresponding to said first air interface and a transmission signal corresponding to said second air interface.

9. The multi-radio card of claim 7 wherein said first channel-access controller is also for receiving a polite request signal from said second radio.

* * * * *